US011146495B2

(12) United States Patent
Ringe et al.

(10) Patent No.: US 11,146,495 B2
(45) Date of Patent: Oct. 12, 2021

(54) PROTOCOL LAYER TUNNELING FOR A DATA PROCESSING SYSTEM

(71) Applicant: Arm Limited, Cambridge (GB)

(72) Inventors: Tushar P. Ringe, Austin, TX (US);
Jamshed Jalal, Austin, TX (US);
Kishore Kumar Jagadeesha, Austin, TX (US)

(73) Assignee: Arm Limited, Cambridge (GB)

( * ) Notice: Subject to any disclaimer, the term of this patent is extended or adjusted under 35 U.S.C. 154(b) by 75 days.

(21) Appl. No.: 16/550,018

(22) Filed: Aug. 23, 2019

(65) Prior Publication Data

US 2021/0058335 A1 Feb. 25, 2021

(51) Int. Cl.
*H04L 12/863* (2013.01)
*H04L 12/801* (2013.01)
*H04L 12/835* (2013.01)
*H04L 12/46* (2006.01)

(52) U.S. Cl.
CPC ...... *H04L 47/6235* (2013.01); *H04L 12/4633* (2013.01); *H04L 47/30* (2013.01); *H04L 47/39* (2013.01); *H04L 47/6225* (2013.01)

(58) Field of Classification Search
CPC . H04L 47/6235; H04L 47/30; H04L 12/4633; H04L 47/6225; H04L 47/39
See application file for complete search history.

(56) References Cited

U.S. PATENT DOCUMENTS

| | | | | |
|---|---|---|---|---|
| 7,047,322 | B1* | 5/2006 | Bauman | G06F 12/0835 710/33 |
| 2013/0042032 | A1* | 2/2013 | Mannava | G06F 13/364 710/52 |
| 2013/0042252 | A1* | 2/2013 | Jalal | G06F 13/374 718/104 |

* cited by examiner

*Primary Examiner* — Jackie Zuniga Abad
(74) *Attorney, Agent, or Firm* — Leveque IP Law, P.C.

(57) ABSTRACT

The present disclosure advantageously provides a system and method for protocol layer tunneling for a data processing system. A system includes an interconnect, a request node coupled to the interconnect, and a home node coupled to the interconnect. The request node includes a request node processor, and the home node includes a home node processor. The request node processor is configured to send, to the home node, a sequence of dynamic requests, receive a sequence of retry requests associated with the sequence of dynamic requests, and send a sequence of static requests associated with the sequence of dynamic requests in response to receiving credit grants from the home node. The home node processor is configured to send the sequence of retry requests in response to receiving the sequence of dynamic requests, determine the credit grants, and send the credit grants.

20 Claims, 13 Drawing Sheets

PROTOCOL LAYER TUNNELING FOR A DATA PROCESSING SYSTEM

BACKGROUND

The present disclosure relates to a data processing system. More particularly, the present disclosure relates to a messaging protocol technique for the data processing system.

A data processing system may be arranged as a system-on-chip (SoC) that includes various components that are connected by an interconnect. Generally, certain components process data, such as, for example, processors, processor clusters, graphic processors, etc., while other components send data to, and receive data from, the data processing components, such as, for example, memory controllers, input/output (I/O) controllers, etc. The data provisioning components may be connected to on-chip or off-chip memory, data buses, wired or wireless networks, etc. The interconnect provides the network infrastructure over which data transactions between components are conveyed.

In one example, an interconnect may implement packet-based communication with a request-response-retry message protocol. Generally, a requester is a component that initiates a transaction over the interconnect by issuing, for example, a request to write data to memory, while a completer is a component that responds to the request over the interconnect. Additionally, the completer may issue a corresponding write request to a slave, such as a memory controller, which performs the write to memory. In this interconnect, if a requester issues a new write request to a completer while the requester is retrying a current write request, the completer may process the new write request before the current write request.

In order to avoid this detrimental "out-of-order" write condition, each requester must wait until the completer issues a completion response to a current write request before issuing a new write request. Unfortunately, this limitation significantly reduces interconnect performance and throughput. Additionally, interconnect performance and throughput may be further reduced because each completer must wait until the slave issues a completion response to the corresponding write request before issuing the completion response to the requester.

DETAILED DESCRIPTION

Figure 1:
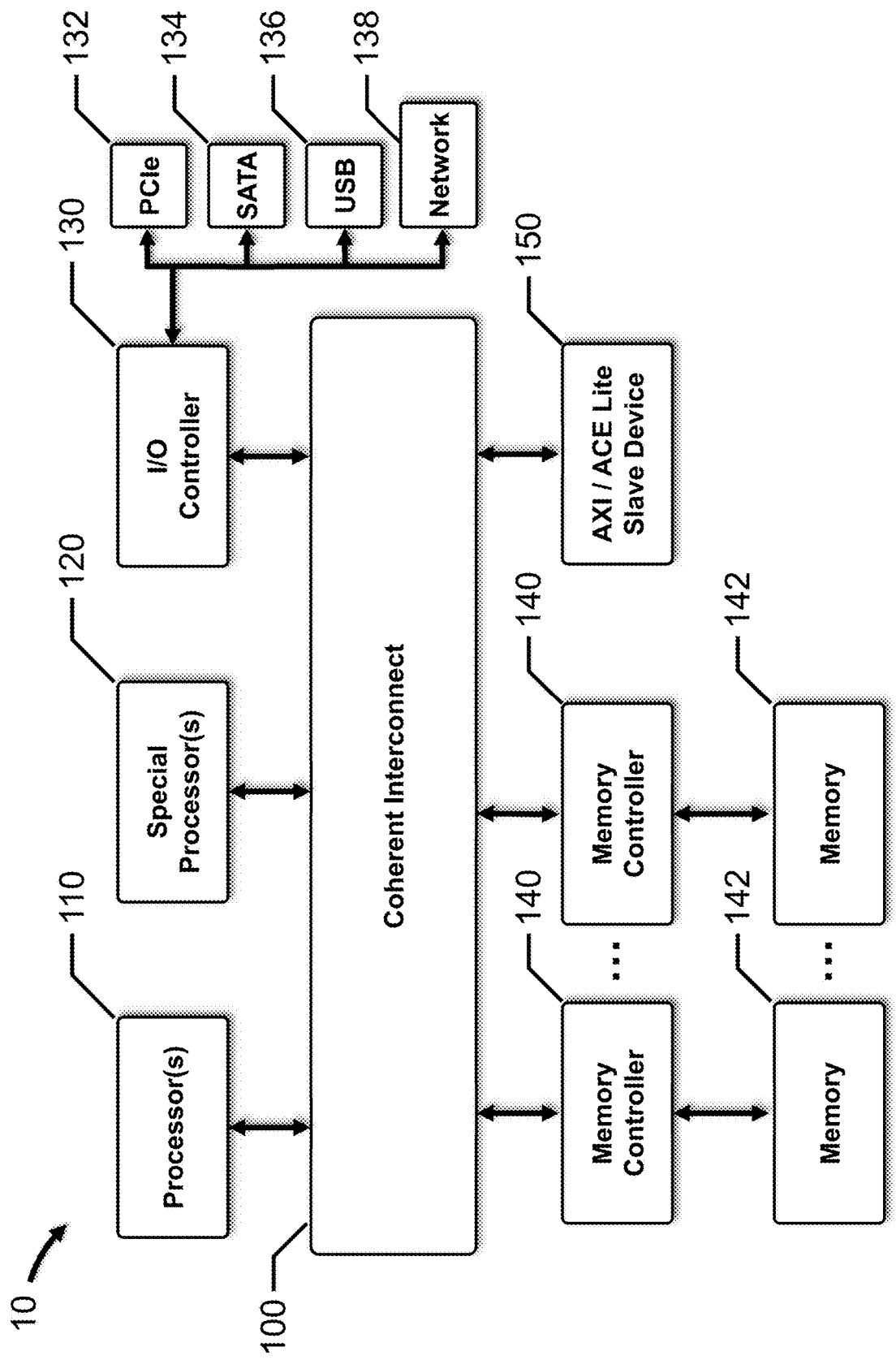
FIG. 1 depicts a block diagram for a SoC, in accordance with an embodiment of the present disclosure.

Embodiments of the present disclosure will now be described with reference to the drawing figures, in which like reference numerals refer to like parts throughout.

Embodiments of the present disclosure provide a system and method for protocol layer tunneling for a data processing system. Protocol layer tunneling advantageously maintains the order of the transactions between the requester and the completer, even in presence of message retries, and significantly improves the performance and throughput of the interconnect. The requester and the completer cooperatively maintain the order of the transactions, as described in more detail below.

In one embodiment, a system includes an interconnect, a request node coupled to the interconnect, and a home node coupled to the interconnect. The request node includes a request node processor, and the home node includes a home node processor.

The request node processor is configured to send, to the home node, a sequence of dynamic requests including at least a first dynamic request followed by a second dynamic request, receive a sequence of retry requests associated with the sequence of dynamic requests, the sequence of retry requests including at least a first retry request associated with the first dynamic request followed by a second retry request associated with the second dynamic request, and, in response to receiving credit grants, send a sequence of static requests associated with the sequence of dynamic requests, the sequence of static requests including at least a first static request associated with the first dynamic request followed by a second static request associated with the second dynamic request.

The home node processor is configured to, in response to receiving the sequence of dynamic requests, send the sequence of retry requests associated with the sequence of dynamic requests, the sequence of retry requests including at least a first retry request associated with the first dynamic request followed by a second retry request associated with the second dynamic request, determine the credit grants associated with the sequence of retry requests, the credit grants including at least a first credit grant and a second credit grant, and send the plurality of credit grants.

FIG. 1 depicts a block diagram for a SoC, in accordance with an embodiment of the present disclosure.

In this embodiment, SoC 10 includes interconnect 100, one or more processors 110, one or more accelerators or special processors 120, I/O controller 130, one or more memory controllers 140, and an Advanced eXtensible Interface (AXI) or AXI coherency extensions (ACE) Lite slave device 150. Alternatively, a simple embodiment may include interconnect 100, processor 110 and memory controller 140.

Interconnect 100 is a communication system that transfers data between processor 110, special processor 120, I/O controller 130, memory controllers 140 and AXI/ACE Lite slave device 150, as well as other components (not depicted for clarity). Each component of SoC 10 that is coupled to interconnect 100 is a requester, a completer or a slave, and is classified as a particular type of interconnect protocol node, as discussed in more detail with respect to FIG. 2.

Generally, interconnect 100 may include, inter alia, a shared or hierarchical bus, a crossbar switch, a packet-based serialized network-on-chip (NoC), etc. Interconnect 101, depicted in FIG. 3A, has a crossbar topology that provides an ordered network with low latency, and may be particularly suitable for a small-sized interconnect with a small number of protocol nodes, switches and wire counts. Interconnect 102, depicted in FIG. 3B, has a ring topology that balances wiring efficiency with latency, which increases linearly with the number of protocol nodes, and may be particularly suitable for a medium-sized interconnect. Interconnect 103, depicted in FIG. 3C, has a mesh topology that has more wires to provide greater bandwidth, is modular and easily scalable by adding more rows and columns of switches or routers, and may be particularly suitable for a large-sized interconnect.

In many embodiments, interconnect 100 is a coherent mesh network that includes multiple switches or router logic modules (routers) arranged in a two-dimensional rectangular mesh topology, such as, for example, the Arm CoreLink Coherent Mesh Network. In this example, the switches or routers are crosspoints (i.e., XPs). Each XP may connect up to four neighboring XPs using mesh ports, and may connect to one or two components (devices) using device ports. Additionally, each XP may support four coherent hub interface (CHI) channels to transport data from a source device to a destination or target device, as described, for example, in the Arm Advanced Microcontroller Bus Architecture 5 (AMBA 5) CHI specification.

In these embodiments, interconnect 100 may have an architecture that includes three layers, i.e., an upper protocol layer, a middle network layer, and a lower link layer. The protocol layer generates and processes requests and responses at the protocol nodes, defines the permitted cache state transitions at the protocol nodes that include caches, defines the transaction flows for each request type, and manages the protocol level flow control. The network layer packetizes the protocol message, determines, and adds to the packet, the source and target node IDs required to route the packet over interconnect 100 to the required destination. The link layer provides flow control between components, and manages link channels to provide deadlock free switching across interconnect 100.

Processor 110 is a general-purpose, central processing unit (CPU) that executes instructions to perform various functions for SoC 10, such as, for example, control, computation, input/output, etc. More particularly, processor 110 may include a single processor core or multiple processor cores, which may be arranged in a processor cluster, such as, for example the Arm Cortex A, R and M families of processors. Generally, processor 110 may execute computer programs or modules, such as an operating system, application software, other software modules, etc., stored within a memory, such as, for example, memory 142. Processor 110 may also include local cache memory.

Accelerator or special processor 120 is a specialized processor that is optimized to perform a specific function, such as process graphics, images and/or multimedia data, process digital signal data, process artificial neural network data, etc. For example, special processor 120 may be a graphics processing unit (GPU), a digital signal processor (DSP), a neural processing unit (NPU), etc. More particularly, special processor 120 may include a single processor core or multiple processor cores, such as, for example the Arm Mali family of GPUs, display processors and video processors, the Arm Machine Learning processor, etc. Special processor 120 may also include local cache memory.

I/O controller 130 includes a microprocessor, microcontroller, application specific integrated circuit (ASIC), field programmable gate array (FPGA), etc., and is configured to transmit data to and from various networks or communication buses using wired and/or wireless connections, including, for example, peripheral component interface express (PCIe) bus 132, serial advanced technology attachment (SATA) bus 134, universal serial bus (USB) 136, network 138, etc. Network 138 may include one or more local area networks, wide area networks, the Internet, etc., which may execute various network protocols, such as, for example, wired and/or wireless Ethernet, Bluetooth, etc. Network 138 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc. In certain embodiments, I/O controller 130 is a system memory management unit (SMMU), such as, for example, the Arm CoreLink MMU family. In other embodiments, I/O controller or bridge 130 includes an Arm CoreLink MMU, which is coupled to PCIe bus 132 and network 138, and an Arm CoreLink Network Interconnect (NIC), which is coupled to SATA bus 134 and USB 136.

Memory controller 140 includes a microprocessor, microcontroller, application specific integrated circuit (ASIC), field programmable gate array (FPGA), etc., and is configured to provide access to memory 142 through interconnect 100. Memory 142 may include a variety of non-transitory computer-readable medium that may be accessed by the other components of SoC 10, such as processor 110, special processor 120, I/O controller 130, etc. For example, memory 142 may store data and instructions for execution by processor 110, special processor 120, etc. In various embodiments, memory 142 may include volatile and nonvolatile medium, non-removable medium and/or removable medium. For example, memory 142 may include any combination of random access memory (RAM), dynamic RAM (DRAM), double data rate (DDR) DRAM or synchronous DRAM (SDRAM), static RAM (SRAM), read only memory (ROM), flash memory, cache memory, and/or any other type of non-transitory computer-readable medium. In certain embodiments, memory controller 140 is a dynamic memory controller that provides data transfers to and from high-density DDR3 or DDR4 DRAM memory, such as, for example, the Arm CoreLink Dynamic Memory Controller (DMC) family, each of which includes a fast, single-port CHI channel interface for connecting to interconnect 100.

Generally, AXI/ACE Lite slave device 150 is a memory or memory-mapped device that includes a microprocessor, microcontroller, application specific integrated circuit (ASIC), field programmable gate array (FPGA), etc., that is configured to transmit and/or receive data. In certain embodiments, AXI/ACE Lite slave device 150 is a peripheral, and in other embodiments, AXI/ACE Lite slave device 150 is a memory.

Figure 2:
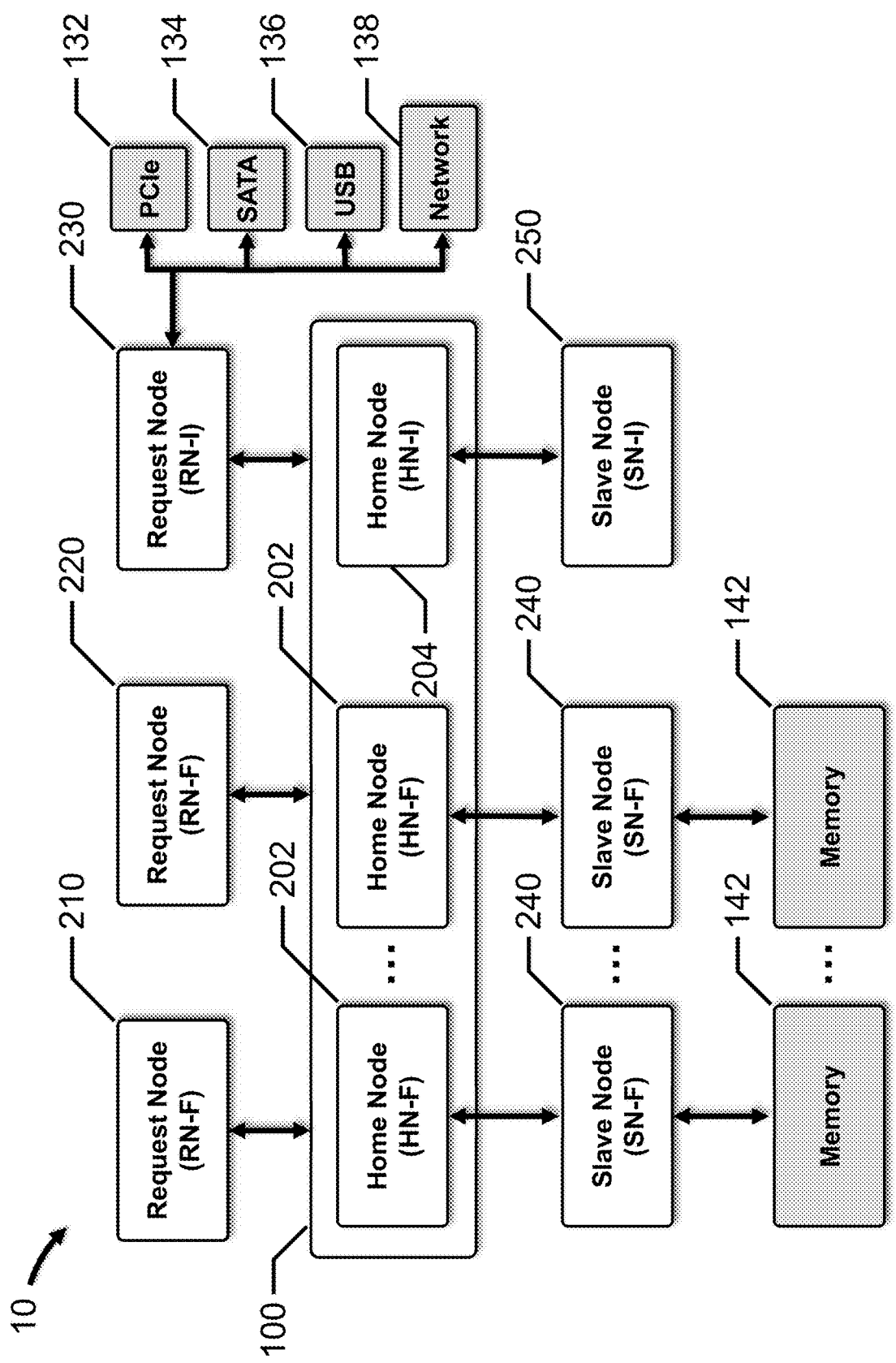
FIG. 2 depicts a block diagram for the SoC using protocol node nomenclature, in accordance with an embodiment of the present disclosure.

FIG. 2 depicts a block diagram for the SoC using protocol node nomenclature, in accordance with an embodiment of the present disclosure.

A requester is represented by a Request Node (RN), which is a protocol node that generates protocol transactions for interconnect 100, such as, for example, memory reads and writes, I/O data transfers, etc. An RN-F protocol node represents "fully" a coherent requester, and an RN-I protocol node represents an "I/O" coherent requester. Processor 110 and special processor 120 are fully coherent requesters, so RN-F 210 represents processor 110, and RN-F 220 represents special processor 120. I/O controller 130 is an I/O coherent requester, so RN-I 230 represents I/O controller 130. In this embodiment, RN-I 230 acts as a bridge or proxy for one of more master devices connected to it through PCIe bus 132, as well as SATA bus 134, USB 136, network 138, etc.

In this embodiment, interconnect 100 includes several completers, each including a microprocessor, microcontroller, application specific integrated circuit (ASIC), field programmable gate array (FPGA), logic circuits, etc., to provide the relevant functionality. Each completer is represented by a Home Node (HN), which is a protocol node that receives protocol transactions from RNs (and SNs described below). Each HN is responsible for managing a specific portion of the overall address space for SoC 10. Similar to RNs, an HN-F protocol node represents a "fully" coherent completer or HN, and an HN-I protocol node represents an "I/O" coherent completer or HN.

In many embodiments, the entire address space of memory 142 is managed by the HN-Fs in SoC 10. Each HN-F may include a system level cache and a snoop traffic filter, and acts as the Point-of-Coherency (PoC) and Point of Serialization (PoS) for the memory requests sent to that HN-F. To avoid conflicts when multiple RN-Fs attempt to access the same memory address, the HN-F 202 assigned to that memory address acts as the PoS for the associated SN-F 240, processing read requests, write requests, etc., in a serial manner. Each HN-I is responsible for managing all of the transactions targeting the address space of a particular slave device or subsystem. In many embodiments, each HN-I may contain an ACE Lite master port to send bus transactions to one or more AXI or ACE-Lite slave devices through an Advanced Microcontroller Bus Architecture (AMBA) connection. In certain embodiments, AXI/ACE Lite slave device 150 is connected to HN-I 204 through an AMBA connection.

A slave is represented by a Slave Node (SN), which is a protocol node that receives and completes requests from the HN-Fs and HN-Is. Similar to RNs, an SN-F protocol node represents a "fully" coherent slave, and an SN-I protocol node represents an "I/O" coherent slave. Memory controller 140 is a slave device, and is represented as SN-F 240. HN-Fs 202 are associated with SN-Fs 240. AXI/ACE Lite slave device 150 is also a slave device, and is represented by SN-I 250. HN-I 204 is associated with SN-I 250.

As discussed above, FIGS. 3A, 3B and 3C depict different topologies for interconnect 100, in accordance with embodiments of the present disclosure.

Figure 3A:
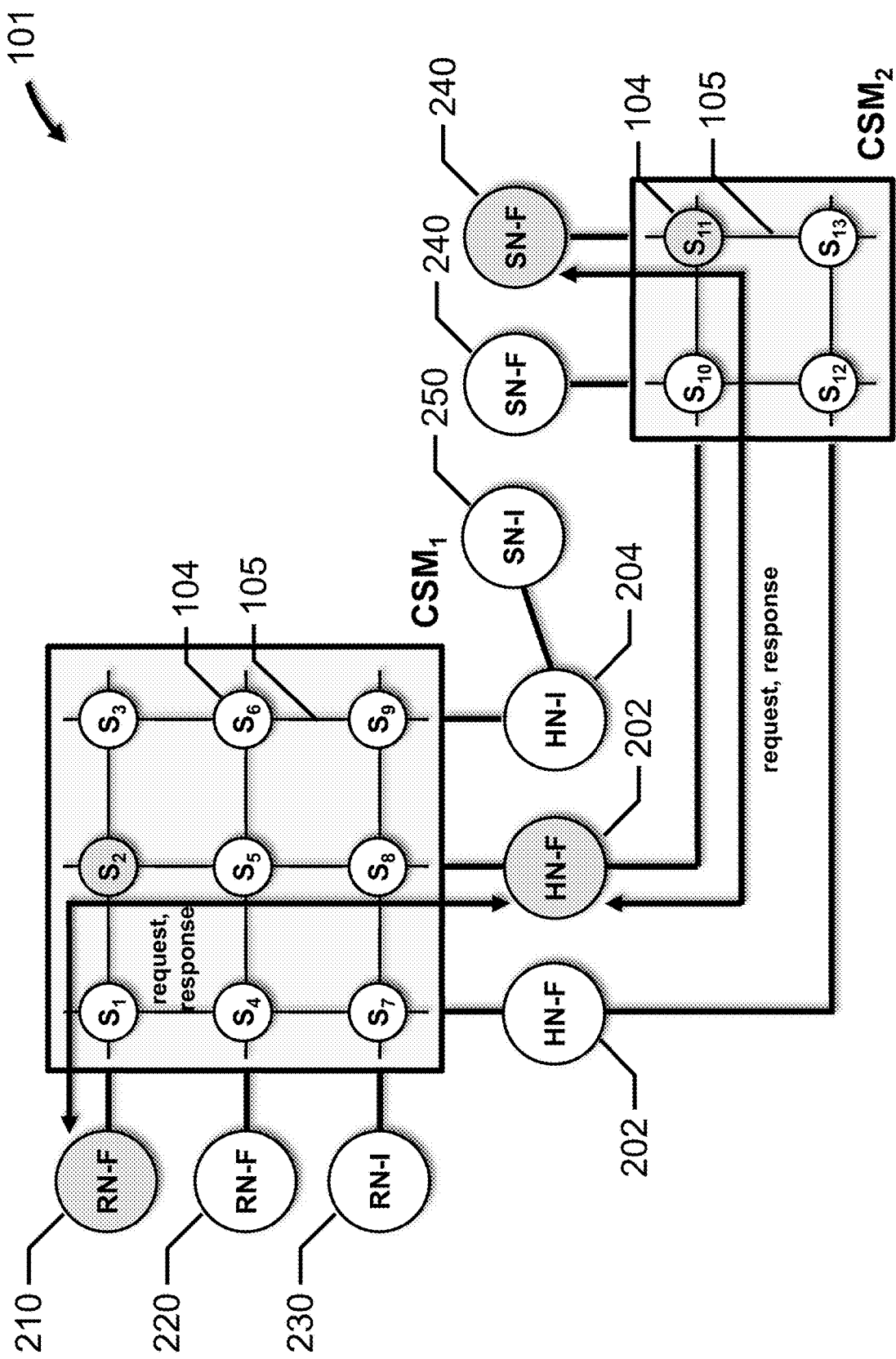
FIGS. 3A, 3B and 3C depict different topologies for an interconnect, in accordance with embodiments of the present disclosure.

FIG. 3A depicts interconnect 101 which has a crossbar topology that is configured to directly connect a pair of protocol nodes to exchange requests and responses. Interconnect 101 includes two crossbar switch matrices, $CSM_1$ and $CSM_2$. $CSM_1$ connects RN-F 210, RN-F 220, and RN-I 230 to HN-Fs 202 and HN-I 204. $CSM_2$ connects HN-Fs 202 to SN-Fs 240. $CSM_1$ includes nine switches 104, $S_1$ to $S_9$, and connections 105 between adjacent switches 104. $CSM_2$ includes four switches 104, $S_{10}$ to $S_{13}$, and connections 105 between adjacent switches 104. Each connection 105 includes a sufficient number of wires to support the channels over which the requests and responses are conveyed. RN-F 210, RN-F 220, RN-I 230, HN-Fs 202 and HN-I 204 are directly connected to $CSM_1$. HN-Fs 202 and SN-Fs 240 are directly connected to $CSM_1$. As depicted in FIG. 3A, HN-Fs 202 and HN-I 204 are directly connected to both $CSM_1$ and $CSM_2$. SN-I 250 is not connected to either $SCM_1$ or $CSM_2$; instead, SN-I 250 is directly connected to HN-I 204.

For example, to exchange requests and responses between RN-F 210 and the second HN-F 202, switch $S_2$ is closed, and to exchange requests and responses between the second HN-F 202 and the second SN-F 240, switch $S_{11}$ is closed. Only a single path between a pair of protocol nodes is configured at one time in each CSM. The relevant elements and paths are highlighted in FIG. 3A.

Figure 3B:
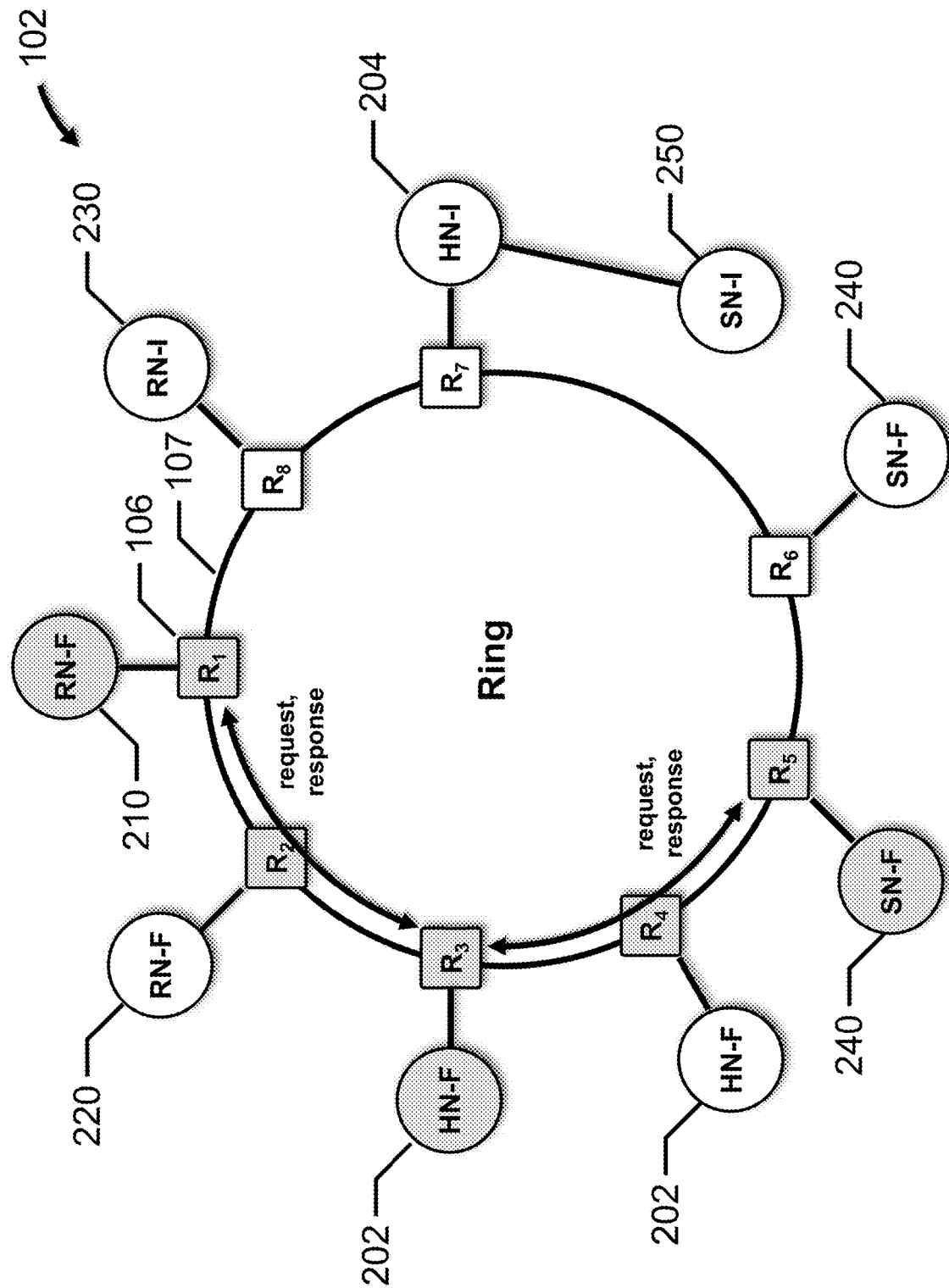

FIG. 3B depicts interconnect 102 which has a ring topology that is configured to connect all of the protocol nodes except SN-I 250. The ring has eight routers 106, $R_1$ to $R_8$, and connections 107 between adjacent routers 106. Each connection 107 includes a sufficient number of wires to support the channels over which the requests and responses are conveyed. RN-F 210 is connected to router $R_1$, RN-F 220 is connected to router $R_2$, RN-I 230 is connected to router $R_8$, the first HN-F 202 is connected to router $R_3$, the second HN-F 202 is connected to router $R_4$, HN-I 204 is connected to router $R_7$, the first SN-F 240 is connected to router $R_5$, and the second SN-F 240 is connected to router $R_6$. SN-I 250 is directly connected to HN-I 204.

For example, to exchange requests and responses between RN-F 210 and the first HN-F 202, the messages are passed through routers $R_1$, $R_2$, and $R_3$, and to exchange requests and responses between the first HN-F 202 and the first SN-F 240, the messages are passed between routers $R_3$, $R_4$, and $R_5$. In the ring topology, multiple requests and responses may be flowing around the ring network at one time. The relevant elements and paths are highlighted in FIG. 3B.

Figure 3C:
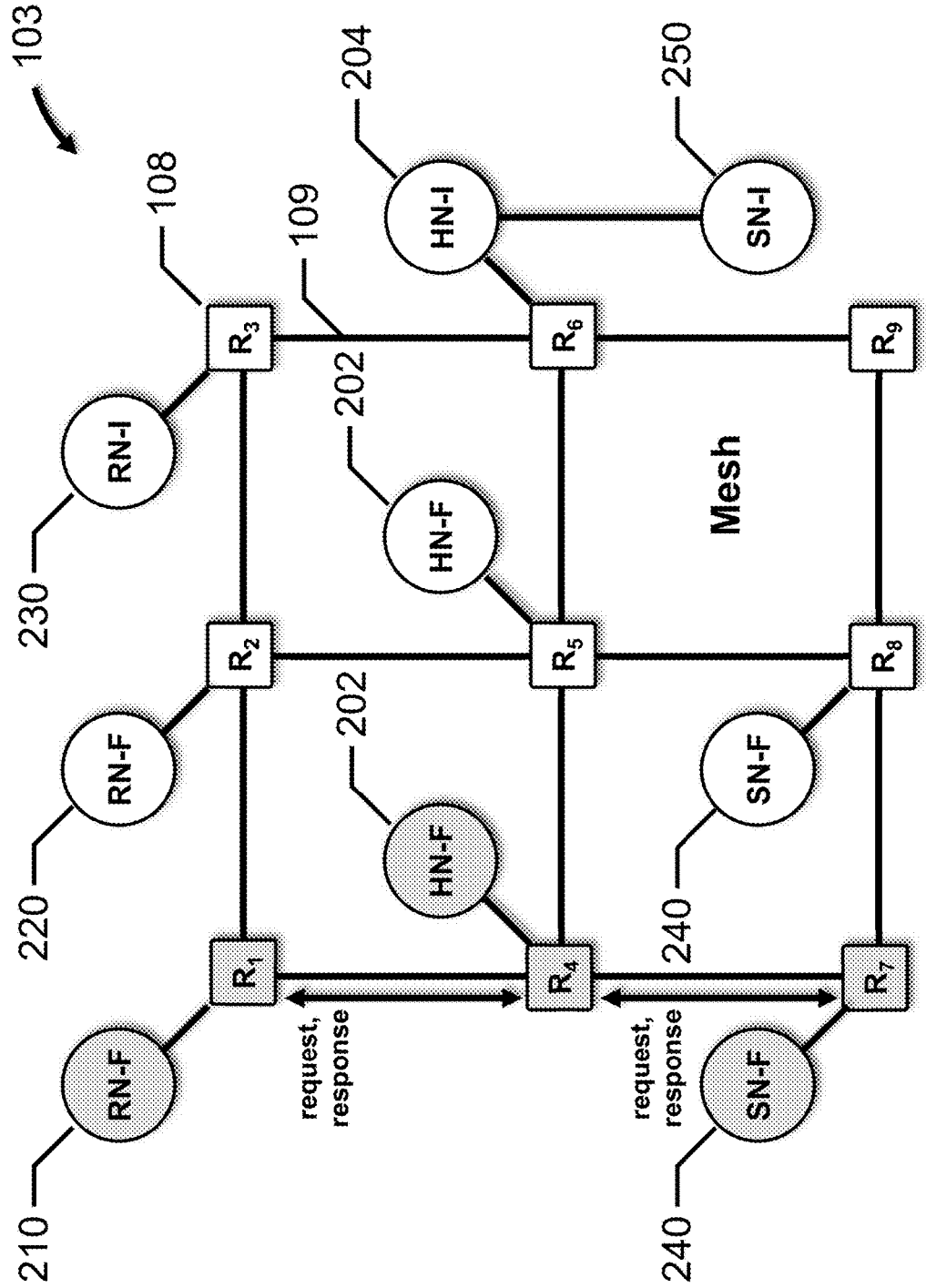

FIG. 3C depicts interconnect 102 which has a mesh topology that is configured to connect all of the protocol nodes except SN-I 250. The mesh has nine routers 108, $R_1$ to $R_9$, and connections 109 between adjacent routers 108. Each connection 109 includes a sufficient number of wires to support the channels over which the requests and responses are conveyed. RN-F 210 is connected to router $R_1$, RN-F 220 is connected to router $R_2$, RN-I 230 is connected to router $R_3$, the first HN-F 202 is connected to router $R_4$, the second HN-F 202 is connected to router $R_5$, HN-I 204 is connected to router $R_6$, the first SN-F 240 is connected to router $R_7$, the second SN-F 240 is connected to router $R_8$. SN-I 250 is directed connected to HN-I 204; router $R_9$ is not connected to a protocol node in this embodiment.

For example, to exchange requests and responses between RN-F 210 and the first HN-F 202, the messages are passed through routers $R_1$ and $R_4$, and to exchange requests and responses between the first HN-F 202 and the first SN-F 240, the messages are passed between routers $R_4$ and $R_7$. In the mesh topology, multiple requests and responses may be flowing through the mesh network at one time. The relevant elements and paths are highlighted in FIG. 3C.

Figure 4:
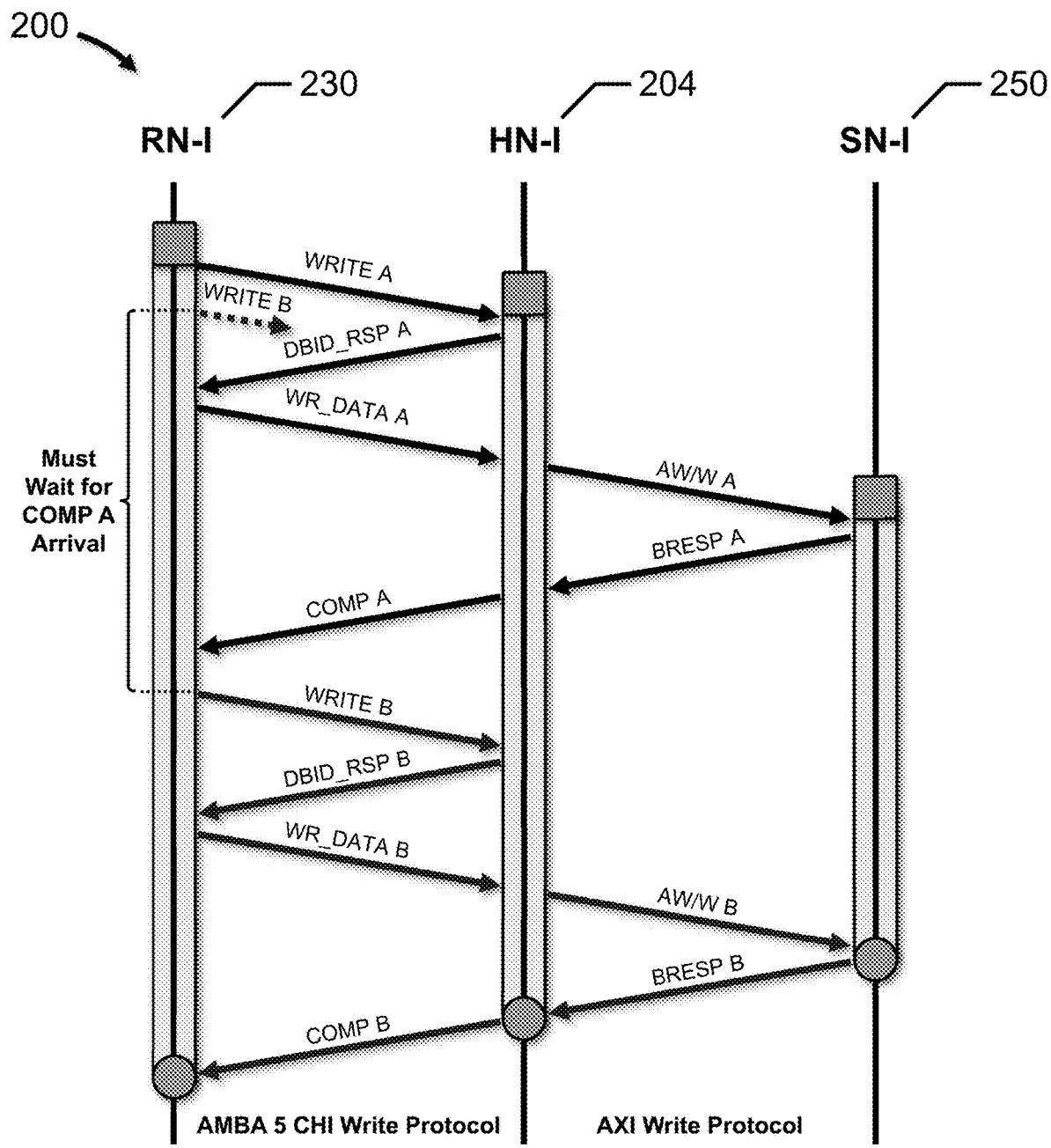
FIG. 4 depicts a protocol flow for an ordered write stream, in accordance with an embodiment of the present disclosure.

FIG. 4 depicts a protocol flow for an ordered write stream, in accordance with an embodiment of the present disclosure.

Protocol flow 200 illustrates an ordered write stream between RN-I 230 and HN-I 204 for PCIe peer-to-peer traffic flowing through an AMBA 5 CHI interconnect 100, and the attendant write stream between HN-I 204 and SN-I 250 flowing through an AMBA AXI connection. The protocol nodes are positioned along the horizontal axis, and time is indicated vertically, from top to bottom. The lifetime of the write transaction at each protocol node is shown by an elongated shaded rectangle along the time axis, which begins with a square and ends with a circle. For interconnect architectures that implement protocol retry mechanisms, such as the AMBA 5 CHI protocol, full serialization of the write stream is required to prevent a detrimental "out-oforder" write condition, as discussed above. Other write protocols are also contemplated.

RN-I 230 sends a WRITE A request message to HN-I 204 over the request channel of interconnect 100, which includes the address to be written. While RN-I 230 may be ready to send a second write request immediately thereafter, i.e., the WRITE B request message shown in dotted line, RN-I 230 must wait until a completion response message for the WRITE A request is received from HN-I 204 over the response channel of interconnect 100 in order to maintain serialization. In response to receiving the WRITE A request message, HN-I 204 sends a DBID_RSP A response message to RN-I 230 over the response channel of interconnect 100, which provides the data buffer identifier for the transaction. In response to receiving the DBID_RSP A response message, RN-I 230 sends a WR_DATA A data message to HN-I 204 over the data channel of interconnect 100, which includes the data to be written.

In response to receiving the WR_DATA A data message, HN-I 204 sends the address to be written and the data to be written to SN-I 250 over the AMBA AXI write address channel (AW) and write data channel (W), respectively. SN-I 250 then responds by sending a BRESP A write response over the write response channel (B), indicating the status of the write transaction. In response to receiving the BRESP A write response, HN-I 204 sends a COMP A write completion response message to RN-I 230 over the response channel. HN-I 204 must wait for the BRESP A write response to arrive from SN-I 250 before sending the COMP A write completion response message because SN-I 250 is the PoS in this embodiment.

After the COMP A write response is received by RN-I 230, the WRITE B write request may be sent to HN-I 204 over the request channel, which ensures that the WRITE B write request is properly ordered behind the WRITE A write request. The WRITE B request message includes the address to be written. In response to receiving the WRITE B request message, HN-I 204 sends a DBID_RSP B response message to RN-I 230 over the response channel, which provides the data buffer identifier for the transaction. In response to receiving the DBID_RSP B response message, RN-I 230 sends a WR_DATA B data message to HN-I 204 over the data channel, which includes the data to be written.

In response to receiving the WR_DATA B data message, HN-I 204 sends the address to be written and the data to be written to SN-I 250 over the AW and W channels, respectively. SN-I 250 then responds by sending a BRESP B write response over B channel, indicating the status of the write transaction. In response to receiving the BRESP B write response, HN-I 204 sends a COMP B write completion response message to RN-I 230 over the response channel.

The bandwidth consumed by ordered writes that maintain serialization was determined to be a small fraction of the available PCIe bandwidth, i.e., 1 GB/s to 4 GB/s for ordered writes that maintain serialization as compared to 32 GB/s for PCIe Gen4 and 64 GB/s for PCIe Gen5.

Figure 5:
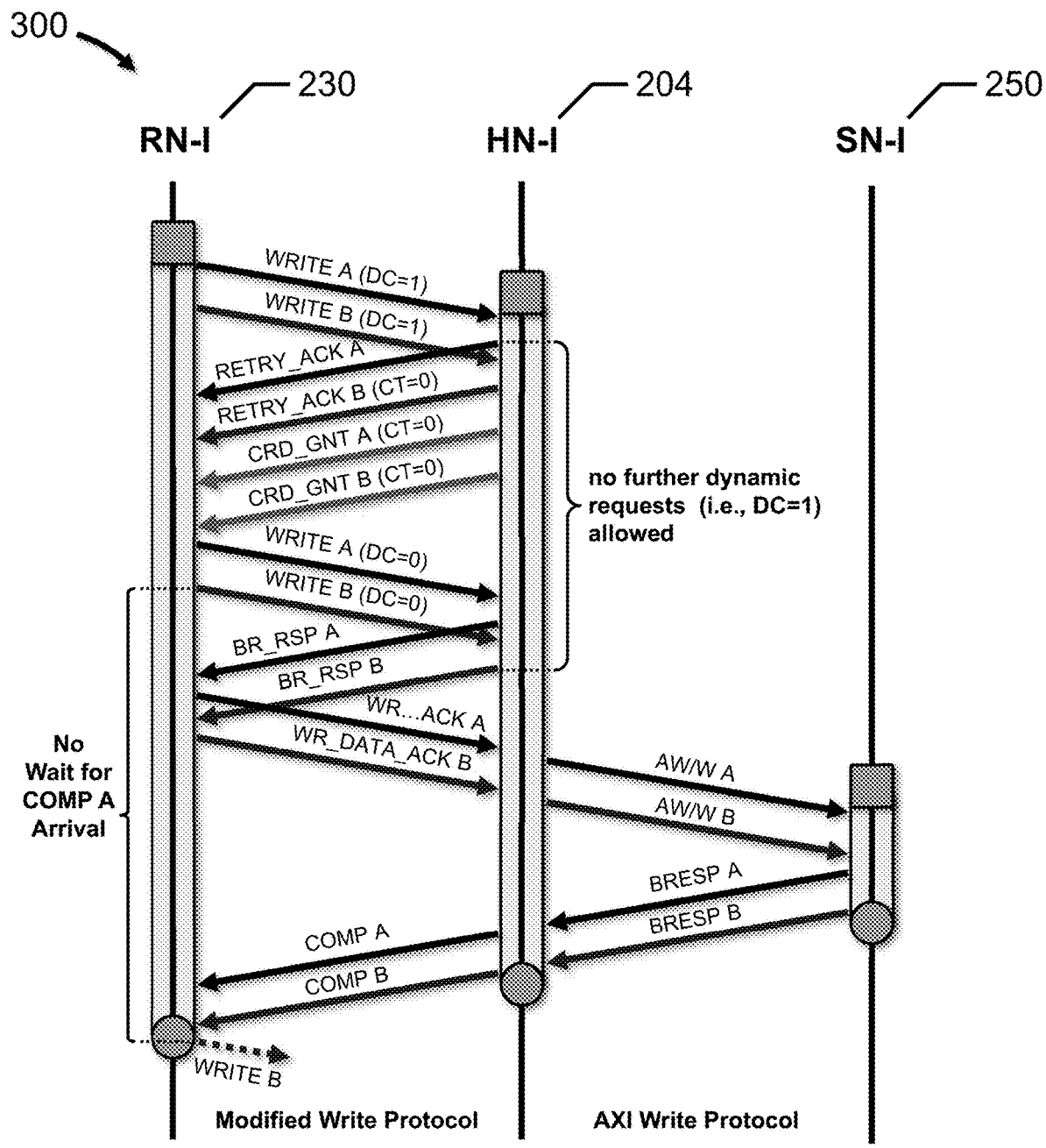
FIG. 5 depicts a protocol tunneling flow for an ordered write stream, in accordance with an embodiment of the present disclosure.

FIG. 5 depicts a protocol tunneling flow for an ordered write stream, in accordance with an embodiment of the present disclosure.

Advantageously, protocol layer tunneling maintains the order of the transactions between the requester, e.g., RN-I 230, and the completer, e.g., HN-I 204, even in presence of protocol retries, and significantly improves the performance and throughput of interconnect 100. The requester and the completer cooperatively maintain the order of the transactions.

Protocol flow 300 illustrates an ordered write stream between RN-I 230 and HN-I 204 for PCIe peer-to-peer traffic flowing through interconnect 100, and the attendant write stream between HN-I 204 and SN-I 250 flowing through an AMBA AXI connection.

RN-I 230 sends a sequence of dynamic requests to HN-I 204 over the request channel. In this embodiment, the sequence of dynamic requests are a sequence of write transactions (i.e., A and B) to SN-I 250, which represents AXI/ACE Lite slave device 150. The first dynamic request in the sequence is a WRITE A request message with a dynamic credit (DC) parameter set to a value, e.g., 1, indicating that the WRITE A request message is a dynamic request. The second dynamic request in the sequence is a WRITE B request message with the DC parameter set to the same value, e.g., 1, indicating that the WRITE B request message is also a dynamic request. The second dynamic request follows the first dynamic request in the sequence of dynamic requests. In other words, the dynamic requests are sent in an age order sequence, over an ordered request channel, from RN-I 230 to HN-I 204.

The WRITE A and WRITE B request messages may include other parameters, such as, for example, an ExpCompAck (ECA) parameter indicating whether the transaction will include a CompAck response, a RequestOrder (RO) parameter indicating whether ordered writes are required for requests from the same source to the same address, etc. In one embodiment, the ECA parameter value for the WRITE A and WRITE B request messages indicates that the transaction will include a CompAck response, e.g., 1, and the RO parameter value indicates that ordered writes are required, e.g., 1.

In this embodiment, in response to receiving the sequence of dynamic requests, HN-I 204 sends a sequence of retry requests associated with the sequence of dynamic requests to the RN-I 230 over the response channel. Sending the sequence of retry requests at this time indicates to RN-I 230 that HN-I 204 does not currently have the capacity to process the dynamic requests. The first retry request in the sequence is a RETRY_ACK A response message with a credit type (CT) parameter set to a particular value, e.g., 0, that is associated with the type of transaction. In this example, the type of transaction is a write transaction to SN-I 250. The second retry request in the sequence is a RETRY_ACK B response message with the CT parameter set to the same value, e.g., 0, indicating that the second retry request is the same type of transaction, i.e., a write transaction to SN-I 250. The first retry request, i.e., RETRY_ACK A, is associated with the first dynamic request, i.e., WRITE A, while the second retry request, i.e., RETRY_ACK B, is associated with the second dynamic request, i.e., WRITE B. The second retry request follows the first retry request in the sequence of retry requests.

HN-I 204 then determines credit grants associated with the sequence of retry requests. In one embodiment, HN-I 204 periodically determines whether one or more of the dynamic requests can be processed based on various factors, such as, for example, processor loading, the number of queued, pending or open transactions or requests, etc. When HN-I 204 determines that one or more dynamic requests can be processed, HN-I 204 issues a number of credit grants corresponding to the number of dynamic requests that can be processed. Generally, the credit grants include at least a first credit grant and a second credit grant, which advantageously increases and significantly improves the performance and throughput of interconnect 100.

HN-I 204 then sends the credit grants to RN-I 230 over the response channel. For example, HN-I 204 sends a CRD_GNT A message to RN-I 230 with a CT parameter set to the same value as the RETRY_ACK A response message, e.g., 0, and a CRD_GNT B message to RN-I 230 with the CT parameter set to the same value as the RETRY_ACK B response message, e.g., 0.

Importantly, at this point in time, both write transaction requests (i.e., A and B) have been "pre-authorized" by HN-I 204 for subsequent allocation and processing, so RN-I 230 does not need to wait for the COMP A response message from HN-I 204 before sending the WRITE B request message, as described above and depicted in FIG. 4.

In response to receiving the credit grants from HN-I 204, RN-I 230 sends a sequence of static requests associated with the sequence of dynamic requests to HN-I 204 over the request channel. The first static request in the sequence is associated with the first dynamic request, and is a WRITE A request message including the address to be written and a DC parameter set to a value, e.g., 0, indicating that the WRITE A request message is a static request, i.e., a request that has been pre-authorized by HN-I 204 for allocation and processing. The second static request in the sequence is associated with the second dynamic request, and is a WRITE B request message with the address to be written and a DC parameter set to the same value, e.g., 0, indicating that the WRITE B request message is also a static request that has been pre-authorized by HN-I 204 for allocation and processing. The second static request follows the first static request in the sequence of static requests. In other words, the static requests are sent in an age order sequence, over an ordered request channel, from RN-I 230 to HN-I 204.

As discussed above, the WRITE A and WRITE B request messages may include other parameters, such as, for example, the ECA parameter, the RO parameter, etc. In one embodiment, the ECA parameter value for the WRITE A and WRITE B request messages indicates that the transaction will include a CompAck response, e.g., 1, and the RO parameter value indicates that ordered writes are required, e.g., 1.

In response to receiving the WRITE A request message, HN-I 204 sends a buffer ready response message (e.g., BR_RSP A) to RN-I 230 over the response channel of interconnect 100, which provides the data buffer identifier for the transaction. Similarly, in response to receiving the WRITE B request message, HN-I 204 sends a buffer ready response message (e.g., BR_RSP B) to RN-I 230 over the response channel of interconnect 100, which provides the data buffer identifier for the transaction.

In response to receiving the BR_RSP A response message, RN-I 230 sends a WR_DATA_ACK A data message to HN-I 204 over the data channel of interconnect 100, which includes the data to be written. Similarly, in response to receiving the BR_RSP B response message, and, importantly, without waiting for the COMP A write response to be received, RN-I 230 sends a WR_DATA_ACK B data message to HN-I 204 over the data channel of interconnect 100, which includes the data to be written.

In response to receiving the WR_DATA A data message, HN-I 204 sends the address to be written and the data to be written to SN-I 250 over the AW and W channels, respectively, using a particular writeID. Similarly, in response to receiving the WR_DATA B data message, HN-I 204 sends the address to be written and the data to be written to SN-I 250 over the AW and W channels, respectively, using the same writeID. SN-I 250 responds by sending BRESP A and BRESP B write responses over the B channel, indicating the status of each write transaction.

In response to receiving the BRESP A write response, HN-I 204 sends a COMP A write completion response message to RN-I 230 over the response channel. HN-I 204 must wait for the BRESP A write response to arrive from SN-I 250 before sending the COMP A write completion response message because SN-I 250 is the PoS in this embodiment. Similarly, in response to receiving the BRESP B write response, HN-I 204 sends a COMP B write completion response message to RN-I 230 over the response channel. HN-I 204 must wait for the BRESP B write response to arrive from SN-I 250 before sending the COMP B write completion response message because SN-I 250 is the PoS in this embodiment.

Figure 6:
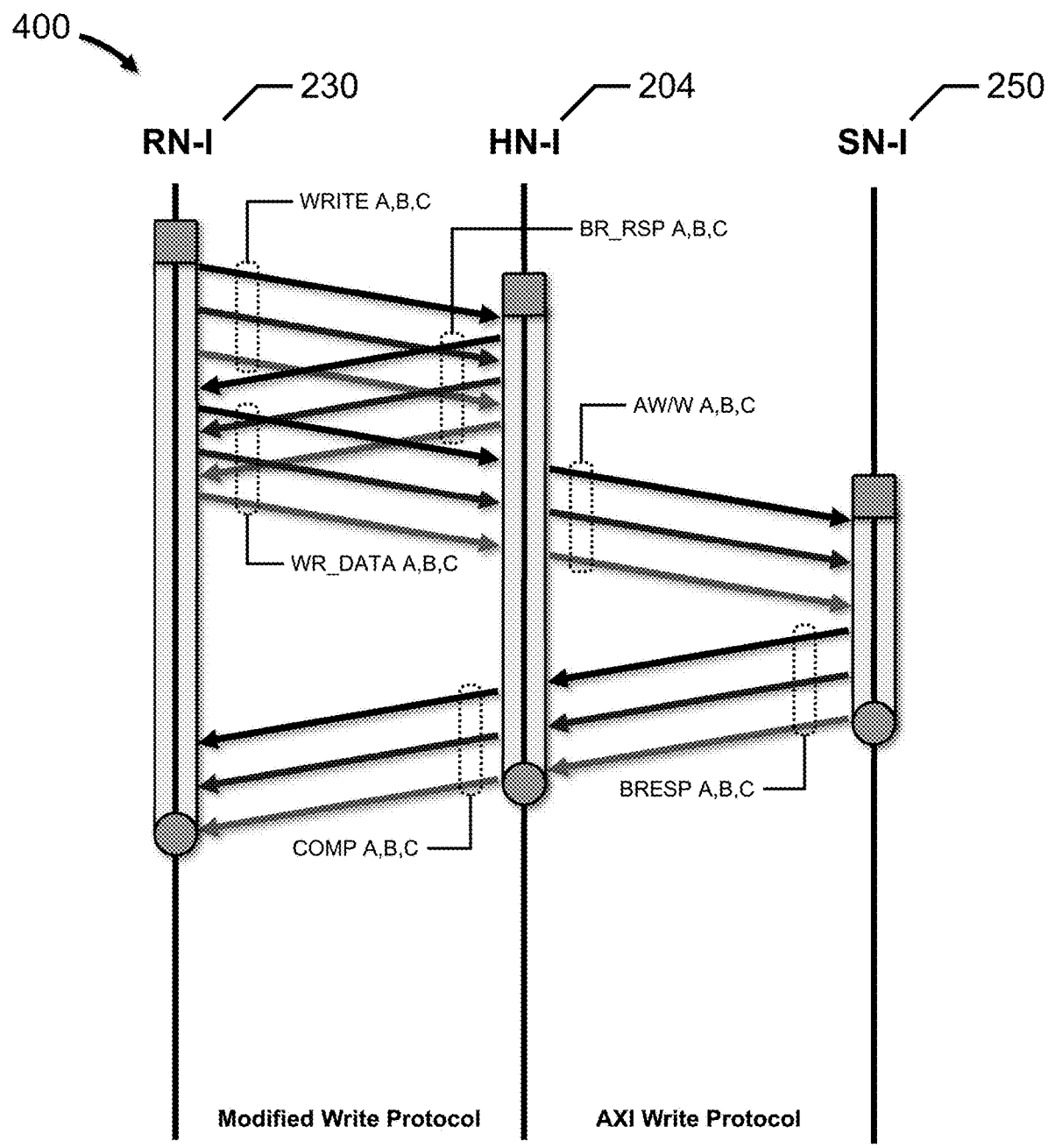
FIG. 6 depicts a protocol tunneling flow for a pipelined ordered write stream, in accordance with an embodiment of the present disclosure.

FIG. 6 depicts a protocol tunneling flow for a pipelined ordered write stream, in accordance with an embodiment of the present disclosure.

Protocol flow 400 illustrates an ordered write stream between RN-I 230 and HN-I 204 for PCIe peer-to-peer traffic flowing through interconnect 100, and the attendant write stream between HN-I 204 and SN-I 250 flowing through an AMBA AXI connection, after the credit grants have been received by RN-I 230. At this time, all of the write transaction requests (i.e., A, B and C) have been "pre-authorized" by HN-I 204 for subsequent allocation and processing, so RN-I 230 does not need to wait for the COMP A and B response messages from HN-I 204 before sending the WRITE B and WRITE C request messages, respectively. Advantageously, there are no bubbles in the protocol flow and full interface bandwidth for PCIe writes may be attained.

In response to receiving the credit grants from HN-I 204, RN-I 230 sends a sequence of static requests associated with the sequence of dynamic requests to HN-I 204 over the request channel. The first static request in the sequence is a WRITE A request message including the address to be written and a DC parameter set to a value, e.g., 0, indicating that the WRITE A request message is a static request, i.e., a request that has been pre-authorized by HN-I 204 for allocation and processing. The second static request in the sequence is a WRITE B request message with the address to be written and a DC parameter set to the same value, e.g., 0, indicating that the WRITE B request message is also a static request that has been pre-authorized by HN-I 204 for allocation and processing. The third static request in the sequence is a WRITE C request message with the address to be written and a DC parameter set to the same value, e.g., 0, indicating that the WRITE C request message is also a static request that has been pre-authorized by HN-I 204 for allocation and processing. The third static request follows the second static request, and the second static request follows the first static request in the sequence of static requests. In other words, the static requests are sent in an age order sequence, over an ordered request channel, from RN-I 230 to HN-I 204.

As discussed above, the WRITE A, WRITE B and WRITE C request messages may include other parameters, such as, for example, the ECA parameter, the RO parameter, etc. In one embodiment, the ECA parameter value for the WRITE A and WRITE B request messages indicates that the transaction will include a CompAck response, e.g., 1, and the RO parameter value indicates that ordered writes are required, e.g., 1.

In response to receiving the WRITE A request message, HN-I 204 sends a buffer ready response message (e.g., BR_RSP A) to RN-I 230 over the response channel of interconnect 100, which provides the data buffer identifier for the transaction. Similarly, in response to receiving the WRITE B request message, HN-I 204 sends a buffer ready response message (e.g., BR_RSP B) to RN-I 230 over the response channel of interconnect 100, which provides the data buffer identifier for the transaction. And, in response to receiving the WRITE C request message, HN-I 204 sends a buffer ready response message (e.g., BR_RSP C) to RN-I 230 over the response channel of interconnect 100, which provides the data buffer identifier for the transaction.

In response to receiving the BR_RSP A response message, RN-I 230 sends a WR_DATA_ACK A data message to HN-I 204 over the data channel of interconnect 100, which includes the data to be written. Similarly, in response to receiving the BR_RSP B response message, and, importantly, without waiting for the COMP A write response to be received, RN-I 230 sends a WR_DATA_ACK B data message to HN-I 204 over the data channel of interconnect 100, which includes the data to be written. And, in response to receiving the BR_RSP C response message, and, importantly, without waiting for the COMP B write response to be received, RN-I 230 sends a WR_DATA_ACK C data message to HN-I 204 over the data channel of interconnect 100, which includes the data to be written.

In response to receiving the WR_DATA A data message, HN-I 204 sends the address to be written and the data to be written to SN-I 250 over the AW and W channels, respectively, using a particular writeID. Similarly, in response to receiving the WR_DATA B data message, HN-I 204 sends the address to be written and the data to be written to SN-I 250 over the AW and W channels, respectively, using the same writeID. Similarly, in response to receiving the WR_DATA C data message, HN-I 204 sends the address to be written and the data to be written to SN-I 250 over the AW and W channels, respectively, using the same writeID. SN-I 250 responds by sending BRESP A, BRESP B and BRESP C write responses over the B channel, indicating the status of each write transaction.

In response to receiving the BRESP A write response, HN-I 204 sends a COMP A write completion response message to RN-I 230 over the response channel. HN-I 204 must wait for the BRESP A write response to arrive from SN-I 250 before sending the COMP A write completion response message because SN-I 250 is the PoS in this embodiment. Similarly, in response to receiving the BRESP B write response, HN-I 204 sends a COMP B write completion response message to RN-I 230 over the response channel. HN-I 204 must wait for the BRESP B write response to arrive from SN-I 250 before sending the COMP B write completion response message because SN-I 250 is the PoS in this embodiment. And, in response to receiving the BRESP C write response, HN-I 204 sends a COMP C write completion response message to RN-I 230 over the response channel. HN-I 204 must wait for the BRESP C write response to arrive from SN-I 250 before sending the COMP C write completion response message because SN-I 250 is the PoS in this embodiment.

Figure 7:
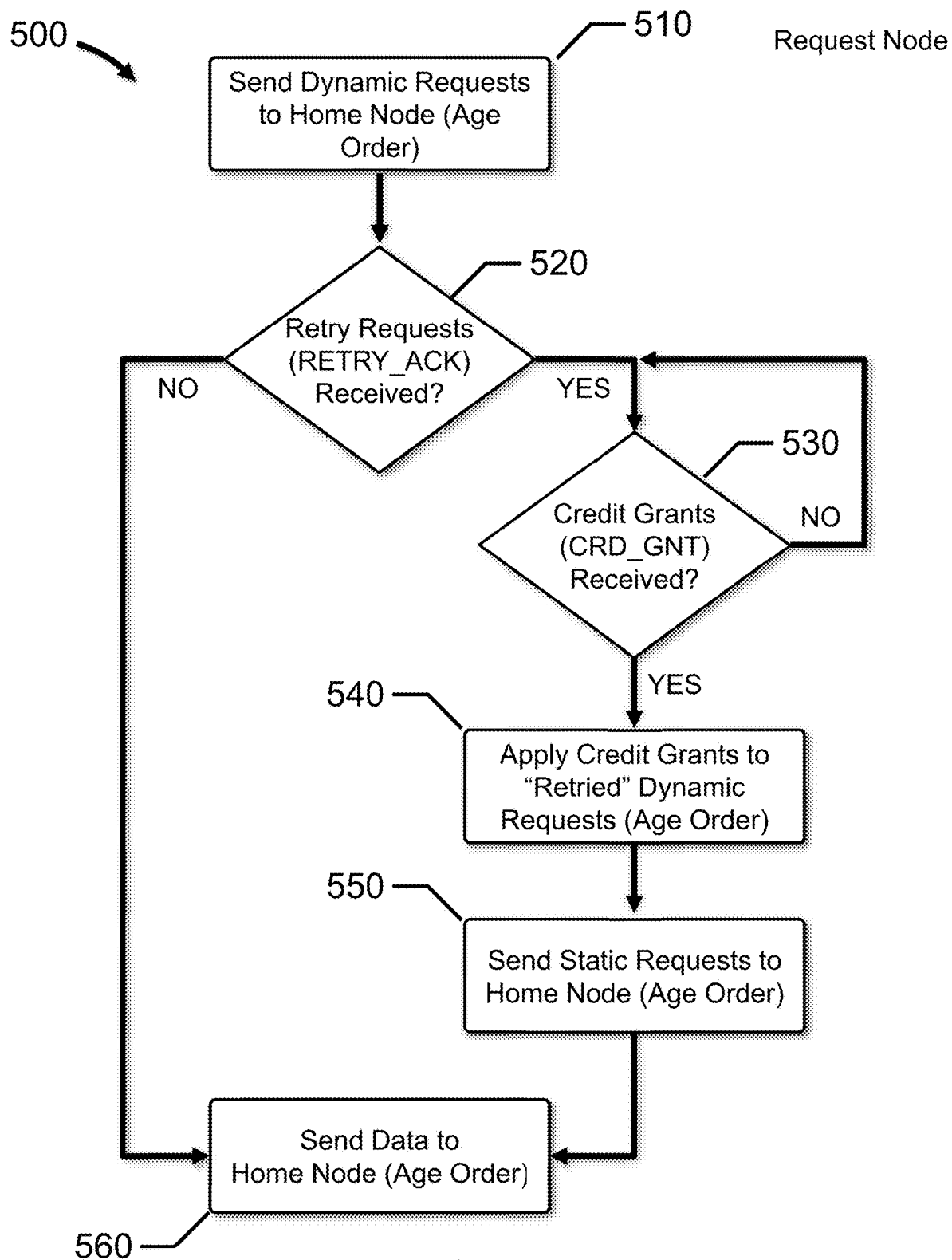
FIG. 7 depicts a flow diagram representing functionality associated with a request node, in accordance with an embodiment of the present disclosure.

FIG. 7 depicts a flow diagram representing functionality associated with a request node, in accordance with an embodiment of the present disclosure.

Flow diagram 500 illustrates a process for a requester, or request node, to maintain age order for dynamic requests until the dynamic requests are sent to a completer, or home node, over interconnect 100. If a dynamic request is retried, as indicated by the receipt of a retry request (i.e., a RETRY_ACK message) from the home node, the "retried" dynamic request is maintained in a pending state along with age order information. When credit grants arrive from the home node (i.e., CRD_GNT messages), each credit grant is allocated to one of the pending "retried" dynamic requests in age order, and a static request, associated with each dynamic request, is sent to the home node, again, in age order, i.e., oldest to youngest.

At 510, the request node sends dynamic requests to the home node, over interconnect 100, in age order.

At 520, the request node determines whether one or more retry requests have been received. If retry requests for the dynamic requests have been received (i.e., yes), flow proceeds to 530. The dynamic requests that are associated with the retry requests are maintained in a pending state, along with age order information, as pending "retried" dynamic requests. If a retry request for a particular dynamic request has not been received after a predetermined timeout period (i.e., no), flow proceeds to 560 for that particular dynamic request. This condition indicates that the home node has the capacity to allocate and process that particular dynamic request.

At 530, the request node determines whether credit grants have been received. If credit grants have been received (i.e., yes), then flow proceeds to 540. If credit grants have not been received (i.e., no), flow pauses until one or more credit grants are received.

At 540, the request node applies the credit grants to the pending "retried" dynamic requests in age order.

At 550, the request node sends static requests associated with the pending "retried" dynamic requests to the home node in age order.

At 560, the request node sends data for the particular dynamic request (from 520) to the home node, and sends data for the static requests (from 550) to the home node in age order.

Figure 8:
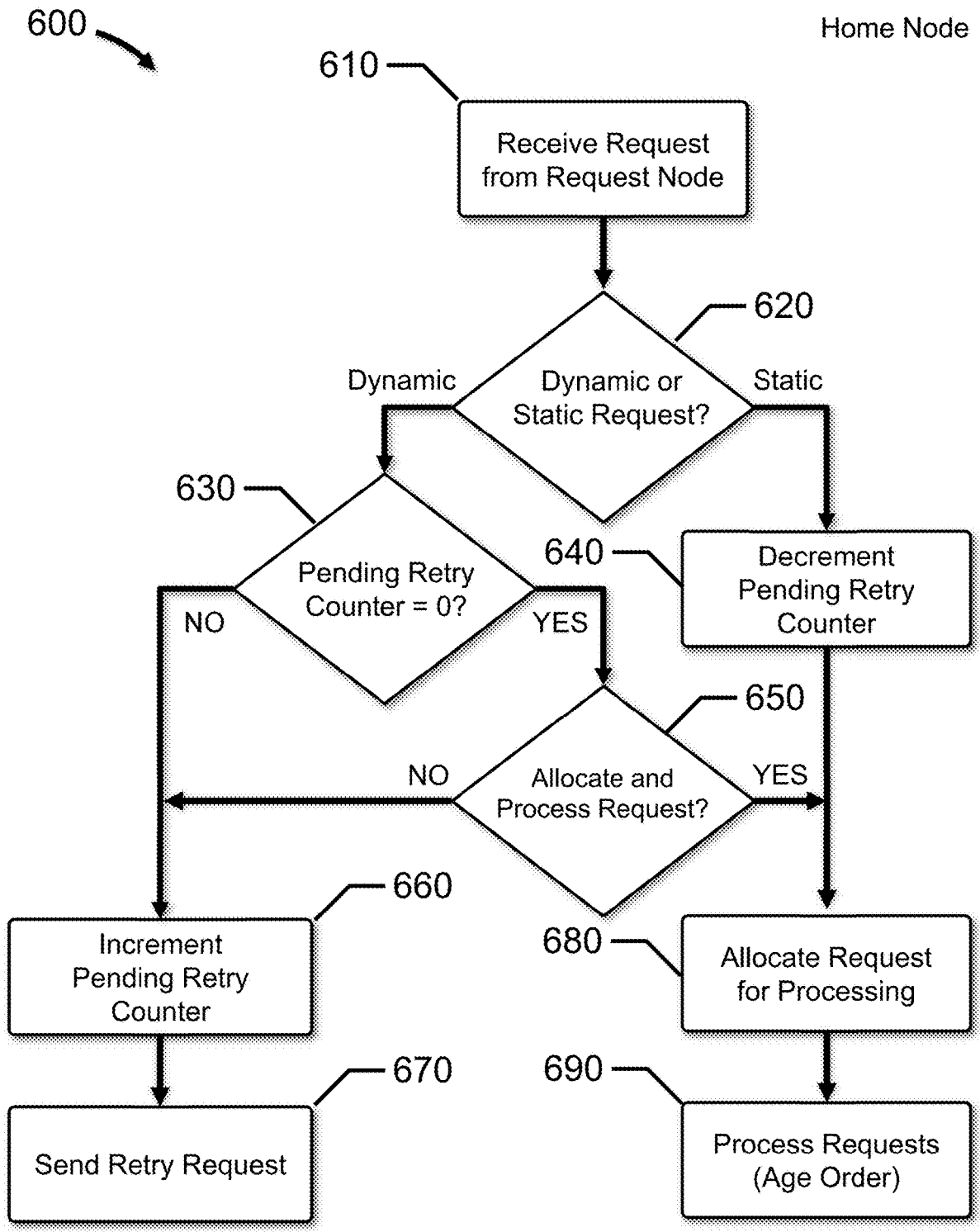
FIG. 8 depicts a flow diagram representing functionality associated with a home node, in accordance with an embodiment of the present disclosure.

FIG. 8 depicts a flow diagram representing functionality associated with a home node, in accordance with an embodiment of the present disclosure.

Flow diagram 600 illustrates a process for a completer, or home node, to allocate and process requests from a requester, or request node, to maintain age order. The home node processes these requests in age order, and then sends these ordered requests to the slave node using same channel ID so that full pipelining of the ordered requests is achieved. If the home node issues a retry request for a particular dynamic request, due to processing load, etc., the home node increments a retry counter. The home node decrements the retry counter when a static request is received. As long as the retry counter is not zero, the home node does not allocate and process new dynamic requests. A dynamic request throttling mechanism may be implemented at the request node to minimize protocol retries.

At 610, the home node receives a request from the request node.

At 620, the home node determines whether the request is a static request or a dynamic request. If the request is a dynamic request (i.e., dynamic), the flow proceeds to 630. If the request is a static request (i.e., static), the flow proceeds to 640.

At 630, the home node determines whether the pending retry counter is zero. If the pending retry counter is zero (i.e., yes), flow proceeds to 650. If the pending retry counter is not zero (i.e., no), flow proceeds to 660.

At 640, the home node decrements the pending retry counter by one, and flow proceeds to 680.

At 650, the home node determines whether to allocate and process the dynamic request. If the home node determines to allocate and process the dynamic request (i.e., yes), flow proceeds to 680. If the home node determines not to allocate and process the dynamic request (i.e., no), flow proceeds to 660.

At 660, the home node increments the pending retry counter by one, and flow proceeds to 670.

At 670, the home node sends a retry request associated with the dynamic request to the request node.

At 680, the home node allocates the dynamic or static request for processing, and flow proceeds to 690. In certain embodiments, the home node enters the dynamic or static request into a processing queue.

At 690, the home node processes the requests in the processing queue in age order.

Figure 9A:
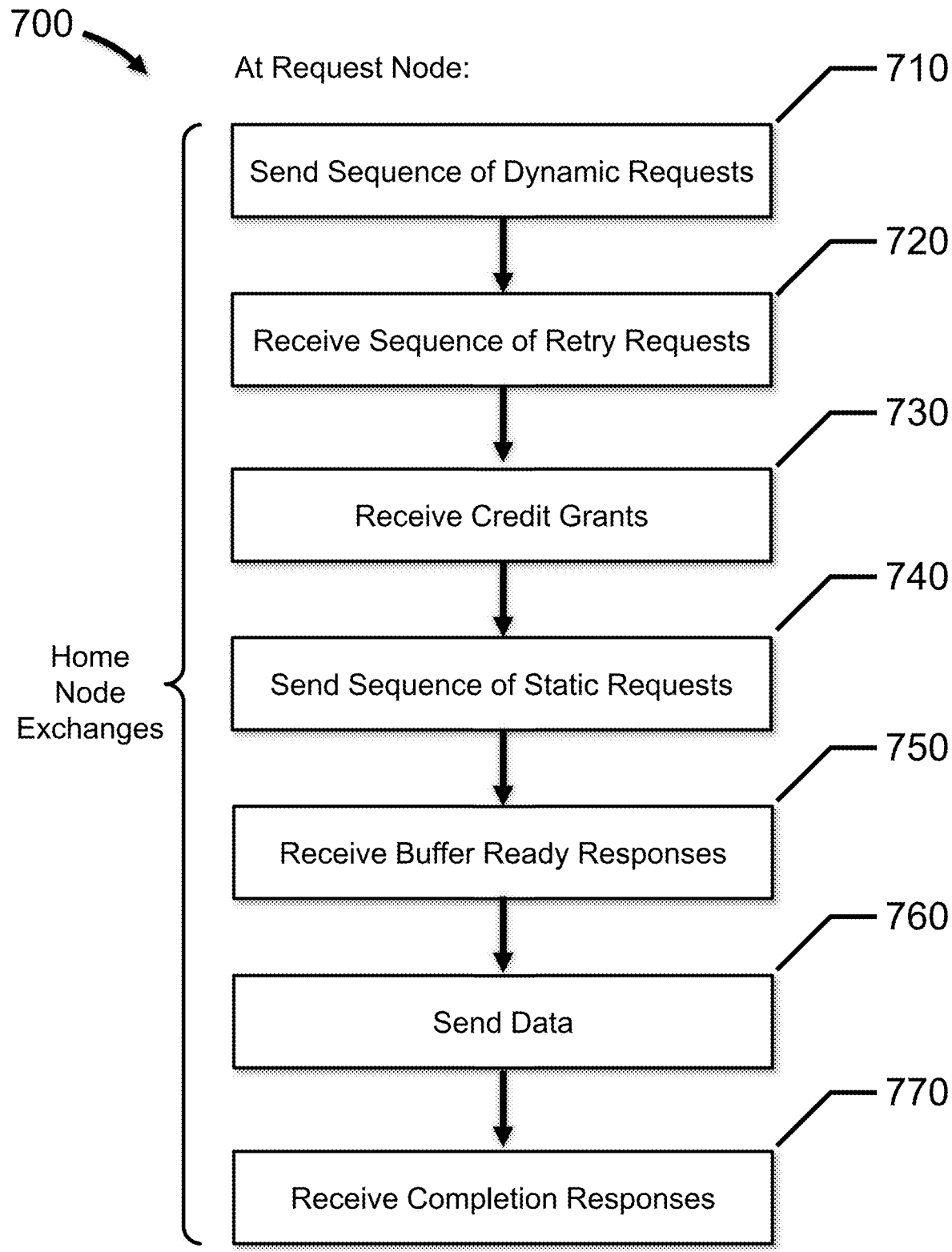
FIGS. 9A, 9B and 9C depict flow diagrams representing functionality associated with protocol layer tunneling in a data processing network, in accordance with embodiments of the present disclosure.
Figure 9B:
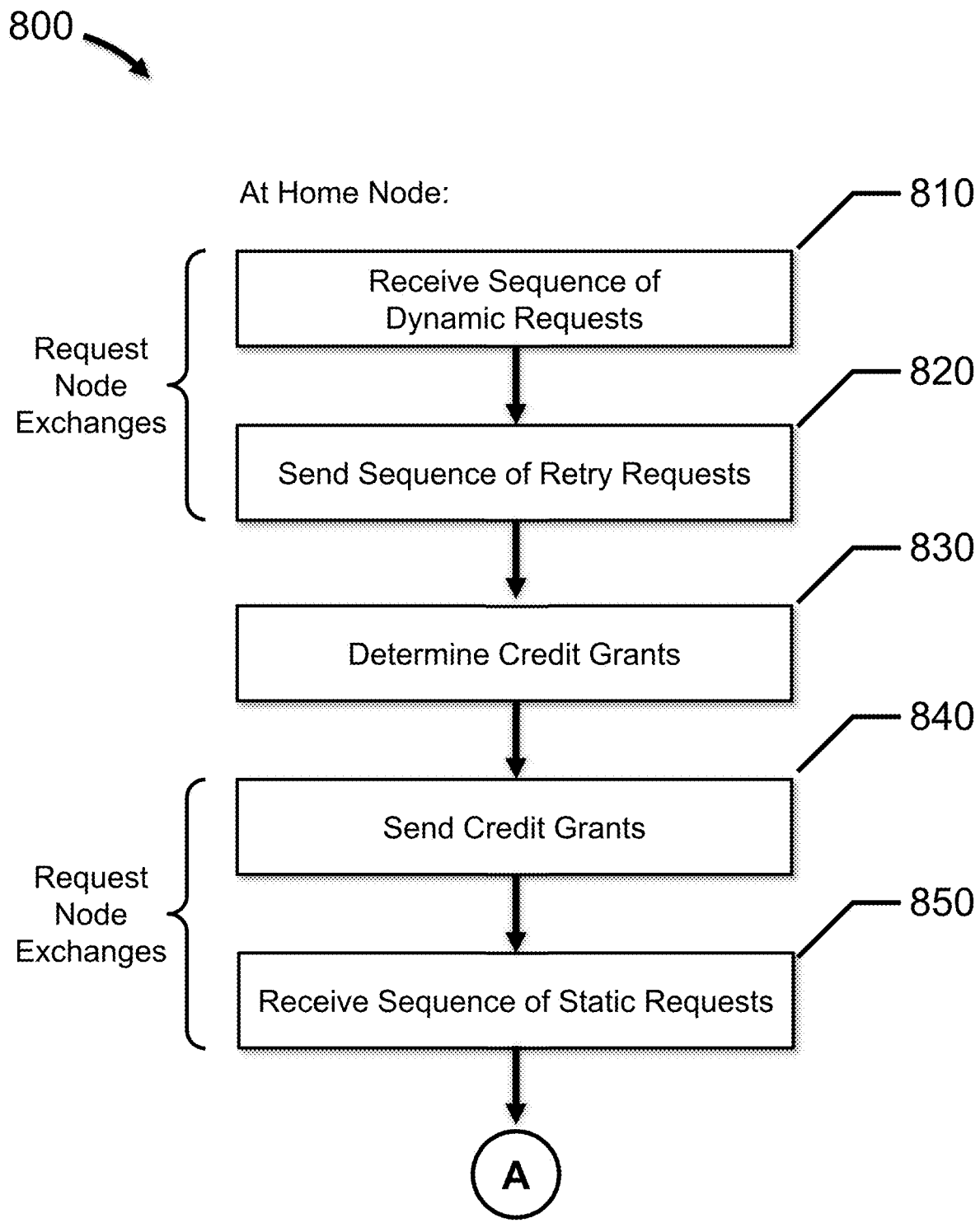
Figure 9C:
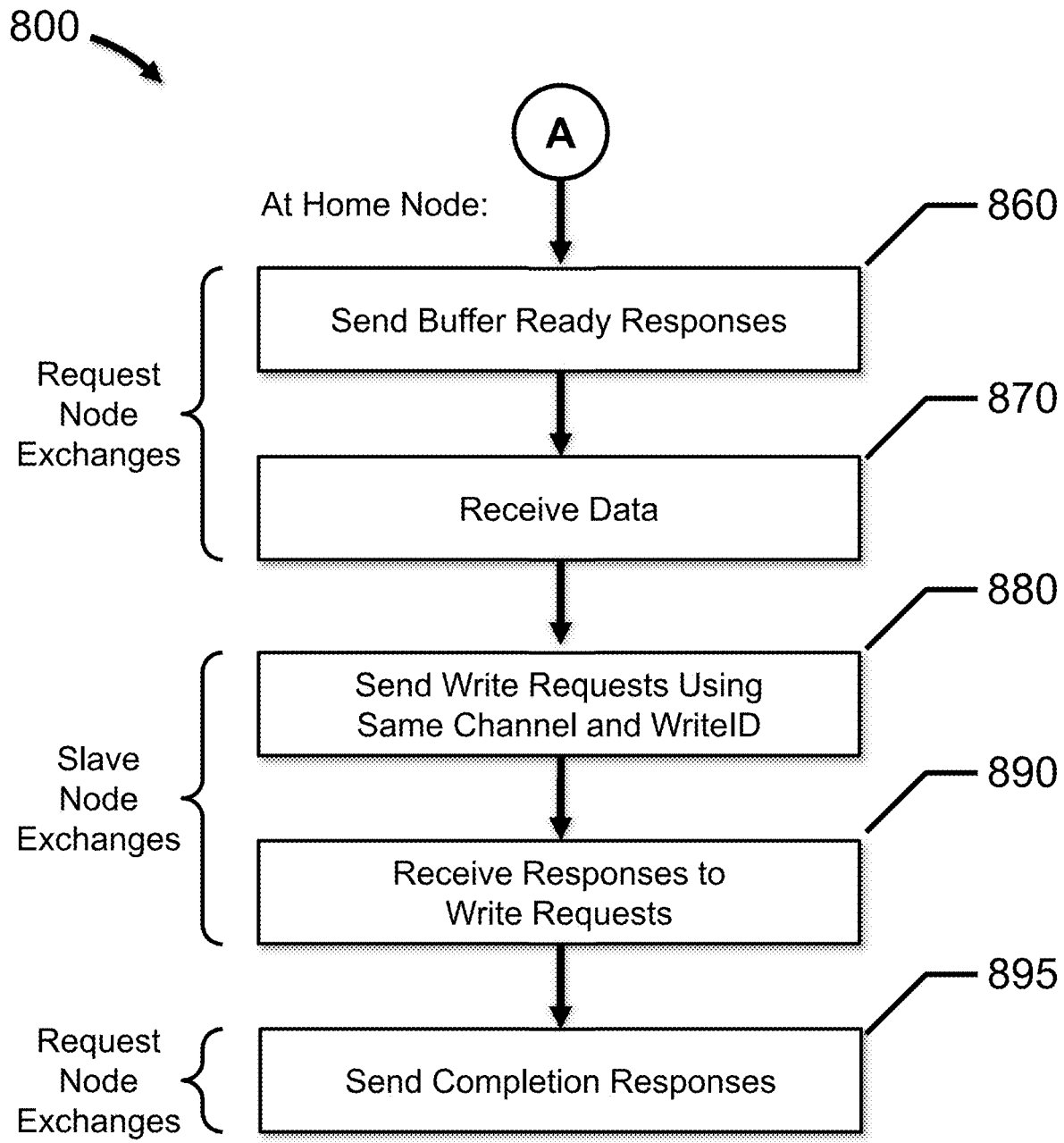

FIGS. 9A, 9B and 9C depict flow diagrams representing functionality associated with protocol layer tunneling in a data processing network, in accordance with embodiments of the present disclosure.

FIG. 9A depicts flow diagram 700, which represents functionality for a request node.

At 710, a sequence of dynamic requests is sent to a home node. The sequence of dynamic requests includes at least a first dynamic request followed by a second dynamic request.

At 720, a sequence of retry requests associated with the sequence of dynamic requests is received from the home node. The sequence of retry requests includes at least a first retry request associated with the first dynamic request followed by a second retry request associated with the second dynamic request.

At 730, credit grants associated with the sequence of retry requests are received from the home node. The credit grants include at least a first credit grant and a second credit grant.

At 740, in response to receiving the credit grants, a sequence of static requests associated with the sequence of dynamic requests is sent to the home node. The sequence of static requests includes at least a first static request associated with the first dynamic request followed by a second static request associated with the second dynamic request.

At 750, a first buffer ready response associated with the first static request and a second buffer ready response associated with the second static request are received from the home node.

At 760, in response to receiving the first buffer ready response, first data associated with the first static request are sent to the home node, and, in response to receiving the second buffer ready response, second data associated with the second static request are sent to the home node. The second data is sent after the first data.

At 770, a first completion response and a second completion response are received from the home node.

FIGS. 9B and 9C depict flow diagram 800, which represents functionality for a home node.

At 810, a sequence of dynamic requests is received from a request node. The sequence of dynamic requests includes at least a first dynamic request followed by a second dynamic request.

At 820, a sequence of retry requests associated with the sequence of dynamic requests is sent to the request node. The sequence of retry requests includes at least a first retry request associated with the first dynamic request followed by a second retry request associated with the second dynamic request.

At 830, credit grants associated with the sequence of retry requests are determined. The credit grants include at least a first credit grant and a second credit grant.

At 840, The credit grants are sent to the request node.

At 850, a sequence of static requests, associated with the sequence of dynamic requests, is received from the request node. The sequence of static requests includes at least a first static request associated with the first dynamic request followed by a second static request associated with the second dynamic request.

At 860, a first buffer ready response associated with the first static request and a second buffer ready response associated with the second static request are sent to the request node. The second buffer ready response is sent after the first buffer ready response.

At 870, first data associated with the first static request and second data associated with the second static request are received from the request node. The second data is received after the first data.

At 880, a first write request is sent, to a slave node, over a channel using a writeID, and a second write request is sent, to the slave node, over the channel using the same writeID, after the first write request. The first write request includes the first data and the first address, and the second write request includes the second data and the second address.

At 890, a first write response and a second write response are received from the slave node. The second write response is received after the first write response.

At 895, a first completion response associated with the first write response is sent to the request node, and a second completion response associated with the second write response is sent to the request node. The second completion response is sent after the first completion response.

Embodiments of the present disclosure advantageously provide a system and a computer-based method for transferring data over an interconnect. While the principles of the present disclosure are presented in the context of a SoC that has an interconnect coupled to various components that are exchanging messages according to a particular protocol, these principles can be applied to any communication system that includes a request-response-retry message protocol. The embodiments described above and summarized below are combinable.

In one embodiment, a method for transferring data over an interconnect includes, at a request node coupled to the interconnect, sending, to a home node coupled to the interconnect, a sequence of dynamic requests including at least a first dynamic request followed by a second dynamic request; receiving, from the home node, a sequence of retry requests associated with the sequence of dynamic requests, the sequence of retry requests including at least a first retry request associated with the first dynamic request followed by a second retry request associated with the second dynamic request; receiving, from the home node, a plurality of credit grants associated with the sequence of retry requests, the plurality of credit grants including at least a first credit grant and a second credit grant; and in response to receiving the plurality of credit grants, sending, to the home node, a sequence of static requests associated with the sequence of dynamic requests, the sequence of static requests including at least a first static request associated with the first dynamic request followed by a second static request associated with the second dynamic request.

In one embodiment, sending the sequence of static requests includes in response to receiving the first credit grant, sending the first static request, and in response to receiving the second credit grant, sending the second static request after sending the first static request.

In one embodiment, each retry request includes a credit type value, each credit grant includes a credit type value, and the credit type values for the retry requests and the credit grants are the same.

In one embodiment, the dynamic requests in the sequence of dynamic requests are sent in age order, and the static requests in the sequence of static requests are sent in age order.

In one embodiment, the interconnect transmits the sequence of dynamic requests and the sequence of static requests over an ordered request channel, and transmits the sequence of retry requests over an ordered response channel.

In one embodiment, the second address is the same as the first address, and the second data are different than the first data.

In one embodiment, a method for transferring data over an interconnect includes, at a home node coupled to the interconnect, receiving, from a request node coupled to the interconnect, a sequence of dynamic requests including at least a first dynamic request followed by a second dynamic request; sending, to the request node, a sequence of retry requests associated with the sequence of dynamic requests, the sequence of retry requests including at least a first retry request associated with the first dynamic request followed by a second retry request associated with the second dynamic request; determining plurality of credit grants associated with the sequence of retry requests, the plurality of credit grants including at least a first credit grant and a second credit grant; sending, to the request node, the plurality of credit grants; and receiving, from the request node, a sequence of static requests associated with the sequence of dynamic requests, the sequence of static requests including at least a first static request associated with the first dynamic request followed by a second static request associated with the second dynamic request.

In one embodiment, determining the plurality of credit grants includes, for each retry request, issuing a credit grant when the home node is not waiting for a pending static request.

In one embodiment, the second static request is received after the first static request is received.

In one embodiment, each retry request includes a credit type value, each credit grant includes a credit type value, and the credit type values for the retry requests and the credit grants are the same.

In one embodiment, the dynamic requests in the sequence of dynamic requests are received in age order, and the static requests in the sequence of static requests are received in age order.

In one embodiment, the interconnect transmits the sequence of dynamic requests and the sequence of static requests over an ordered request channel, and transmits the sequence of retry requests over an ordered response channel.

In one embodiment, the first dynamic request and the first static request are requests to write data to a first address, the second dynamic request and the second static request are requests to write data to a second address, and the method further includes, at the home node, sending, to the request node, a first buffer ready response associated with the first static request; sending, to the request node, a second buffer ready response associated with the second static request, the second buffer ready response being sent after the first buffer ready response; receiving, from the request node, first data associated with the first static request; receiving, from the request node, second data associated with the second static request, the second data being received after the first data; sending, to a slave node coupled to the interconnect, a first write request including the first data and the first address, the first write request being sent over a channel using a writeID; sending, to the slave node, a second write request including the second data and the second address, the second write request being sent over the channel using the writeID after the first write request; receiving, from the slave node, a first write response; receiving, from the slave node, a second write response after receiving the first write response; sending, to the request node, a first completion response associated with the first write response; and sending, to the request node, a second completion response associated with the second write response, the second completion response being sent after the first completion response.

In one embodiment, the second address is the same as the first address, and the second data are different than the first data.

In one embodiment, the method further includes, at the home node, in response to receiving each dynamic request, determining whether a pending retry counter is zero; when the pending retry counter is zero, sending, to the request node, a response associated with the dynamic request, and receiving, from the request node, data associated with the dynamic request; when the pending retry counter is not zero, incrementing the pending retry counter, and sending, to the request node, the retry request associated with the dynamic request; and in response to receiving each static request, decrementing the pending retry counter.

In one embodiment, the system includes an interconnect; a request node, coupled to the interconnect, including a request node processor; and a home node, coupled to the interconnect, including a home node processor. The request node processor is configured to send, to the home node, a sequence of dynamic requests including at least a first dynamic request followed by a second dynamic request, receiving, from the home node, a sequence of retry requests associated with the sequence of dynamic requests, the sequence of retry requests including at least a first retry request associated with the first dynamic request followed by a second retry request associated with the second dynamic request, and in response to receiving a plurality of credit grants from the home node, send, to the home node, a sequence of static requests associated with the sequence of dynamic requests, the sequence of static requests including at least a first static request associated with the first dynamic request followed by a second static request associated with the second dynamic request. The home node processor is configured to, in response to receiving the sequence of dynamic requests, send, to the request node, the sequence of retry requests associated with the sequence of dynamic requests, determine the plurality of credit grants associated with the sequence of retry requests, the plurality of credit grants including at least a first credit grant and a second credit grant, and send, to the request node, the plurality of credit grants.

In one embodiment, the first dynamic request and the first static request are requests to write data to a first address; the second dynamic request and the second static request are requests to write data to a second address; and the request node processor is further configured to in response to receiving a first buffer ready response associated with the first static request from the home node, send, to the home node, first data associated with the first static request, and in response to receiving a second buffer ready response associated with the second static request from the home node, send, to the home node, second data associated with the second static request, the second data being sent after the first data; receive, from the home node, a first completion response associated with the first static request; and receive, from the home node, a second completion response associated with the second static request, the second completion response being received after the first completion response.

In one embodiment, the system further includes a slave node, coupled to the interconnect, including a slave node processor, and the home node processor is further configured to send, to the request node, the first buffer ready response and the second buffer ready response, the second buffer ready response being sent after the first buffer ready response; in response to receiving the first data, send, to the slave node, a first write request including the first data and the first address, the first write request being sent over a channel using a writeID; in response to receiving the second data, send, to the slave node, a second write request including the second data and the second address, the second write request being sent over the channel using the writeID after the first write request; receive, from the slave node, a first write response; receive, from the slave node, a second write response after receiving the first write response; send, to the request node, the first completion response, the first completion response being associated with the first write response; and send, to the request node, the second completion response, the second completion response being associated with the second write response, and the second completion response being sent after the first completion response.

In one embodiment, to determine the plurality of credit grants includes, for each retry request, to issue a credit grant when the home node is not waiting for a pending static request.

In one embodiment, each retry request includes a credit type value, each credit grant includes a credit type value, and the credit type values for the retry requests and the credit grants are the same.

In one embodiment, the dynamic requests in the sequence of dynamic requests are received in age order, the static requests in the sequence of static requests are received in age order, and the interconnect transmits the sequence of dynamic requests and the sequence of static requests over an ordered request channel.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, the terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "many embodiment," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A computer-based method for transferring data over an interconnect, comprising:
at a request node coupled to the interconnect:
sending, to a home node coupled to the interconnect, a sequence of dynamic requests including at least a first dynamic request followed by a second dynamic request;
receiving, from the home node, a sequence of retry requests associated with the sequence of dynamic requests, the sequence of retry requests including at least a first retry request associated with the first dynamic request followed by a second retry request associated with the second dynamic request;

receiving, from the home node, a plurality of credit grants associated with the sequence of retry requests, the plurality of credit grants including at least a first credit grant and a second credit grant;

in response to receiving the plurality of credit grants, sending, to the home node, a sequence of static requests associated with the sequence of dynamic requests, the sequence of static requests including at least a first static request associated with the first dynamic request followed by a second static request associated with the second dynamic request; and receiving, from the home node, a first completion response associated with the first static request;

where the second static request is sent to the home node prior to receiving the first completion response from the home node.

2. The computer-based method according to claim 1, where said sending the sequence of static requests includes:
in response to receiving the first credit grant, sending the first static request, and
in response to receiving the second credit grant, sending the second static request after sending the first static request.

3. The computer-based method according to claim 1, where each retry request includes a credit type value, each credit grant includes a credit type value, and the credit type values for the retry requests and the credit grants are the same.

4. The computer-based method according to claim 1, where the dynamic requests in the sequence of dynamic requests are sent in age order, and the static requests in the sequence of static requests are sent in age order.

5. The computer-based method according to claim 4, where the interconnect transmits the sequence of dynamic requests and the sequence of static requests over an ordered request channel, and transmits the sequence of retry requests over an ordered response channel.

6. The computer-based method according to claim 1, where the first dynamic request and the first static request are requests to write data to a first address, the second dynamic request and the second static request are requests to write data to a second address, and the method further comprises:
at the request node:
receiving, from the home node, a first buffer ready response associated with the first static request;
receiving, from the home node, a second buffer ready response associated with the second static request, the second buffer ready response being received after the first buffer ready response;
in response to receiving the first buffer ready response, sending, to the home node, first data associated with the first static request;
in response to receiving the second buffer ready response, sending, to the home node, second data associated with the second static request, the second data being sent after the first data; and
receiving, from the home node, a second completion response associated with the second static request, the second completion response being received after the first completion response.

7. A computer-based method for transferring data over an interconnect, comprising:
at a home node coupled to the interconnect:
receiving, from a request node coupled to the interconnect, a sequence of dynamic requests including at least a first dynamic request followed by a second dynamic request;

sending, to the request node, a sequence of retry requests associated with the sequence of dynamic requests, the sequence of retry requests including at least a first retry request associated with the first dynamic request followed by a second retry request associated with the second dynamic request;

determining plurality of credit grants associated with the sequence of retry requests, the plurality of credit grants including at least a first credit grant and a second credit grant;

sending, to the request node, the plurality of credit grants;

receiving, from the request node, a sequence of static requests associated with the sequence of dynamic requests, the sequence of static requests including at least a first static request associated with the first dynamic request followed by a second static request associated with the second dynamic request; and sending, to the request node, a first completion response associated with the first static request, where the second static request is received from the request node prior to sending the first completion response to the request node.

8. The computer-based method according to claim 7, where said determining the plurality of credit grants includes, for each retry request, issuing a credit grant when the home node is not waiting for a pending static request.

9. The computer-based method according to claim 7, where the second static request is received after the first static request is received.

10. The computer-based method according to claim 7, where each retry request includes a credit type value, each credit grant includes a credit type value, and the credit type values for the retry requests and the credit grants are the same.

11. The computer-based method according to claim 7, where the dynamic requests in the sequence of dynamic requests are received in age order, and the static requests in the sequence of static requests are received in age order.

12. The computer-based method according to claim 11, where the interconnect transmits the sequence of dynamic requests and the sequence of static requests over an ordered request channel, and transmits the sequence of retry requests over an ordered response channel.

13. The computer-based method according to claim 7, where the first dynamic request and the first static request are requests to write data to a first address, the second dynamic request and the second static request are requests to write data to a second address, and the method further comprises:
at the home node:
sending, to the request node, a first buffer ready response associated with the first static request;
sending, to the request node, a second buffer ready response associated with the second static request, the second buffer ready response being sent after the first buffer ready response;
receiving, from the request node, first data associated with the first static request;
receiving, from the request node, second data associated with the second static request, the second data being received after the first data;
sending, to a slave node coupled to the interconnect, a first write request including the first data and the first address, the first write request being sent over a channel using a writeID;
sending, to the slave node, a second write request including the second data and the second address, the second write request being sent over the channel using the writeID after the first write request;

receiving, from the slave node, a first write response;
receiving, from the slave node, a second write response after receiving the first write response; and
sending, to the request node, a second completion response associated with the second write response, the second completion response being sent after the first completion response.

14. The computer-based method according to claim 7, further comprising:
in response to receiving each dynamic request, determining whether a pending retry counter is zero;
when the pending retry counter is zero, sending, to the request node, a response associated with the dynamic request, and receiving, from the request node, data associated with the dynamic request;
when the pending retry counter is not zero, incrementing the pending retry counter, and sending, to the request node, the retry request associated with the dynamic request; and
in response to receiving each static request, decrementing the pending retry counter.

15. A system, comprising:
an interconnect;
a request node, coupled to the interconnect, including a request node processor; and
a home node, coupled to the interconnect, including a home node processor,
the request node processor configured to:
send, to the home node, a sequence of dynamic requests including at least a first dynamic request followed by a second dynamic request,
receive, from the home node, a sequence of retry requests associated with the sequence of dynamic requests, the sequence of retry requests including at least a first retry request associated with the first dynamic request followed by a second retry request associated with the second dynamic request,
in response to receiving a plurality of credit grants from the home node, send, to the home node, a sequence of static requests associated with the sequence of dynamic requests, the sequence of static requests including at least a first static request associated with the first dynamic request followed by a second static request associated with the second dynamic request, and
receive, from the home node, a first completion response associated with the first static request,
where the second static request is sent to the home node prior to receiving the first completion response from the home node, and
the home node processor configured to:
in response to receiving the sequence of dynamic requests, send, to the request node, the sequence of retry requests associated with the sequence of dynamic requests,
determine the plurality of credit grants associated with the sequence of retry requests, the plurality of credit grants including at least a first credit grant and a second credit grant,
send, to the request node, the plurality of credit grants, and
send, to the request node, the first completion response.

16. The system according to claim 15, where:
the first dynamic request and the first static request are requests to write data to a first address;
the second dynamic request and the second static request are requests to write data to a second address; and
the request node processor is further configured to:
in response to receiving a first buffer ready response associated with the first static request from the home node, send, to the home node, first data associated with the first static request, and
in response to receiving a second buffer ready response associated with the second static request from the home node, send, to the home node, second data associated with the second static request, the second data being sent after the first data; and
receive, from the home node, a second completion response associated with the second static request, the second completion response being received after the first completion response.

17. The system according to claim 16, further comprising:
a slave node, coupled to the interconnect, including a slave node processor,
where the home node processor is further configured to:
send, to the request node, the first buffer ready response and the second buffer ready response, the second buffer ready response being sent after the first buffer ready response;
in response to receiving the first data, send, to the slave node, a first write request including the first data and the first address, the first write request being sent over a channel using a writeID;
in response to receiving the second data, send, to the slave node, a second write request including the second data and the second address, the second write request being sent over the channel using the writeID after the first write request;
receive, from the slave node, a first write response;
receive, from the slave node, a second write response after receiving the first write response;
send, to the request node, the second completion response,
where the first completion response is associated with the first write response, the second completion response is associated with the second write response, and the second completion response is sent after the first completion response.

18. The system according to claim 15, where said determine the plurality of credit grants includes, for each retry request, issue a credit grant when the home node is not waiting for a pending static request.

19. The system according to claim 15, where each retry request includes a credit type value, each credit grant includes a credit type value, and the credit type values for the retry requests and the credit grants are the same.

20. The system according to claim 15, where the dynamic requests in the sequence of dynamic requests are received in age order, the static requests in the sequence of static requests are received in age order, and the interconnect transmits the sequence of dynamic requests and the sequence of static requests over an ordered request channel.

* * * * *